United States Patent [19]
Burrows

[11] Patent Number: 6,077,427
[45] Date of Patent: Jun. 20, 2000

[54] WATER VENDING MACHINE

[76] Inventor: Bruce D. Burrows, 25555 W. Avenue Stanford, Valencia, Calif. 91355-1101

[21] Appl. No.: 09/159,974

[22] Filed: Sep. 24, 1998

[51] Int. Cl.$^7$ .............................. B01D 17/12; E05B 65/06
[52] U.S. Cl. .................................. 210/198.1; 222/153.03; 222/320; 70/78; 70/82
[58] Field of Search ................................ 210/198.1, 205, 210/147; 222/153.02, 153.03, 320, 504; 312/215, 216; 239/104, 288; 70/78–82, 120, 158

[56] References Cited

U.S. PATENT DOCUMENTS

| | | | |
|---|---|---|---|
| 2,627,362 | 2/1953 | Balaz | 222/153.03 |
| 3,089,330 | 5/1963 | Kerr | 70/140 |
| 3,457,744 | 7/1969 | Bisbing | 70/82 |
| 3,856,676 | 12/1974 | Grimme, Jr. et al. | 210/138 |
| 4,160,727 | 7/1979 | Harris, Jr. | 210/140 |
| 5,540,848 | 7/1996 | Engelhard | 210/748 |
| 5,911,884 | 6/1999 | Boulter | 210/739 |

*Primary Examiner*—David A. Simmons
*Assistant Examiner*—Frank M. Lawrence
*Attorney, Agent, or Firm*—Kelly Bauersfeld Lowry & Kelley, LLP

[57] ABSTRACT

A water vending machine is provided of the type having a water purification system for producing a supply of relatively purified water for dispensing into a customer-supplied container such as a water bottle. The vending machine includes an open dispense chamber for receiving and supporting the water bottle beneath a dispense nozzle through which water is delivered in response to coin-initiated operation of a machine control panel. A trap door normally conceals and thereby prevents unauthorized access to the dispense nozzle, wherein the trap door is retracted upon operation of the control panel to expose the dispense nozzle and permit water dispensing to the bottle. In addition, the vending machine includes an improved door lock assembly including a square-shaped and rotatable main lock cartridge seated in a locked condition within a matingly shaped lock case, wherein this door lock assembly provides improved security locking of a machine access door.

19 Claims, 10 Drawing Sheets

WATER VENDING MACHINE

BACKGROUND OF THE INVENTION

This invention relates generally to improvements in the construction and operation of vending machines, particularly such as vending machines of the type designed for producing and dispensing relatively purified water into a customer-supplied container such as a five gallon water bottle or the like. More specifically, this invention relates to an improved dispense nozzle unit for dispensing water, wherein the nozzle unit is normally concealed and protected against unauthorized access from the exterior of the vending machine. Moreover, this invention relates to an improved door lock assembly for securely locking a machine access door in a manner providing improved resistance to vandalism and/or unauthorized door opening.

Vending machines for producing and dispensing relatively purified water are generally known in the art. Such vending machines typically comprise a metal machine cabinet which houses a water purification system such as a reverse osmosis and/or filtration system for producing a supply of relatively purified water from a tap water source. The vending machine cabinet normally defines a forwardly open dispense chamber into which a customer can place a water bottle or the like beneath a dispense nozzle. A control panel on the machine cabinet is then manipulated by the customer, in conjunction with the deposit of an appropriate payment via one or more coin slots or the like, to activate the machine to dispense a selected volume of purified water into the customer-supplied bottle. Water vending machines of this type are commonly available at many modern shopping centers and supermarket facilities to provide customers with a convenient and economic source of purified water for drinking and cooking uses, as an alternative to traditional bottled water delivery services and/or the rental or purchase of purification systems designed for in-home use.

One problem encountered by water vending machines of this general type pertains to maintaining water-contacting surfaces such as the dispense nozzle in a desired state of cleanliness, so that the water dispensed for customer use is in fact pure and sanitary. In this regard, the discharge end of the dispense nozzle is typically exposed at the upper side of the open dispense chamber, whereat the dispense nozzle can be manually grasped or otherwise contacted by foreign objects from the exterior of the vending machine. Such exposure unfortunately subjects the dispense nozzle to inadvertent contamination as well as deliberate vandalism.

Moreover, the front panel on the cabinet of a typical water vending machine comprises a hinged access door which is normally closed and locked to prevent public access to the machine interior. The access door is periodically opened by service personnel to maintain the interior components of the vending machine, and also to collect money deposited into the machine by water customers. Experience has shown, however, that the access door on a typical vending machine is subject to occasional unauthorized opening or attempted opening, frequently resulting in significant damage which must be repaired before the vending machine can be returned to normal service.

The present invention relates to improvements in vending machines of the type designed for producing and dispensing relatively purified water, particularly with respect to providing a water dispense nozzle which is normally concealed and protected against unauthorized access from the exterior of the machine. In addition, the present invention provides an improved locking arrangement for a machine access door, wherein the improved locking arrangement is resistance to tampering and damage attributable to unauthorized attempts to open the door.

SUMMARY OF THE INVENTION

In accordance with the invention, a water vending machine is provided for producing a supply of relatively purified water for dispensing to a customer-supplied container such as a water bottle. The vending machine comprises a substantially enclosed cabinet within which a purification system is mounted, with a dispense nozzle positioned generally at the top of a forwardly open dispense chamber adapted for receiving and supporting a water bottle to be filled. A trap door normally conceals and protects the dispense nozzle against unauthorized access from the exterior of the vending machine, wherein the trap door is opened upon appropriate manipulation of a machine control panel to expose the dispense nozzle for delivery of a selected volume of water.

In the preferred form, the vending machine cabinet encases the water purification system comprising a reverse osmosis purification unit which may include additional filtration components as shown and described in U.S. Pat. No. 5,045,197, which is incorporated by reference herein. The purification system is coupled to a water source such as a standard tap water supply, and processes this water inflow to produce relatively purified water which is stored in a reservoir for dispensing on demand. Upon operation of the control panel, normally to include an appropriate deposit of money, a selected volume of water is delivered from the storage reservoir to the dispense nozzle for dispensing.

The dispense nozzle comprises a portion of a dispense nozzle unit which further includes a dispense valve adapted for timed opening to dispense the selected volume of water. The dispense nozzle and valve are mounted on a slide carriage for vertical sliding displacement within the machine cabinet between a normal inoperative position elevated above a top wall of the forwardly open dispense chamber, and a lowered operative position with the dispense nozzle protruding through a dispense port formed in said top wall for dispensing purified water into a customer-supplied bottle. An actuator such as a pneumatic cylinder is provided for displacing the dispense nozzle and valve between the upper inoperative and the lower operative positions. The trap door is linked to the actuator for sliding movement between a normal position overlying and closing the dispense port when the dispense nozzle unit is in the upper inoperative position, and for uncovering and opening the dispense port upon movement of the dispense nozzle unit to the lower operative position.

In accordance a further aspect of the invention, the machine cabinet includes a hinged access door which is normally closed and retained in a secure locked condition by an improved lock assembly. The lock assembly comprises a main lock cartridge mounted on the access door and having a primary latch bolt normally engaged with a keeper mounted on the cabinet, wherein the main lock cartridge has a noncircular and preferably square shape and is normally seated within a matingly shaped lock case to prevent rotation thereof. Appropriate operation of a lock cylinder by means of a key or the like retracts the primary latch bolt from its associated keeper, to permit retraction of the main lock cartridge from the lock case. Upon such retraction, the main lock cartridge can be rotated to retract at least one and preferably a pair of secondary latch bolts from associated keepers mounted on the cabinet, to permit opening of the access door.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
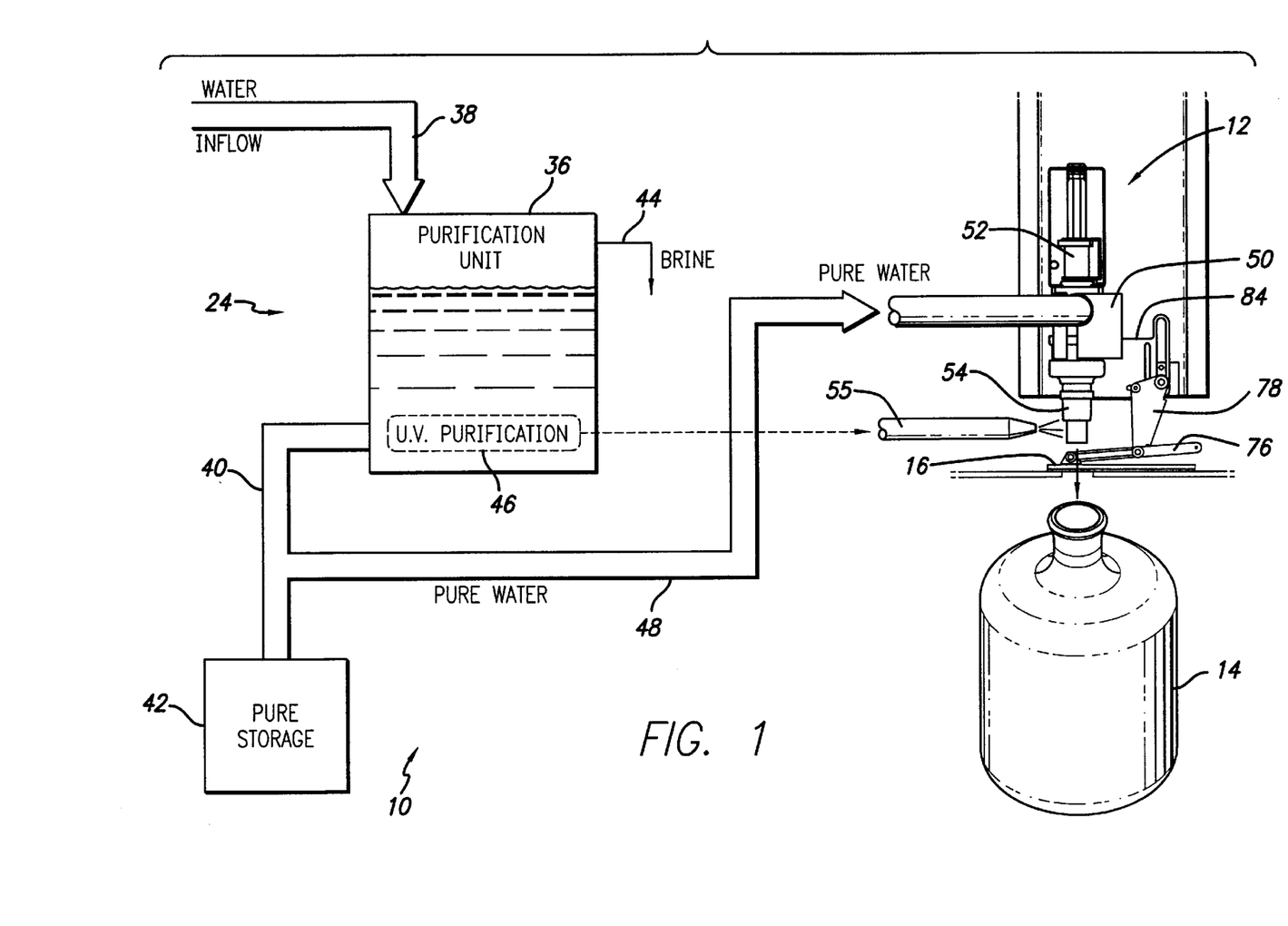
FIG. 1 is a schematic diagram illustrating water purification and dispensing components of a water vending machine constructed in accordance with the invention.
Figure 2:
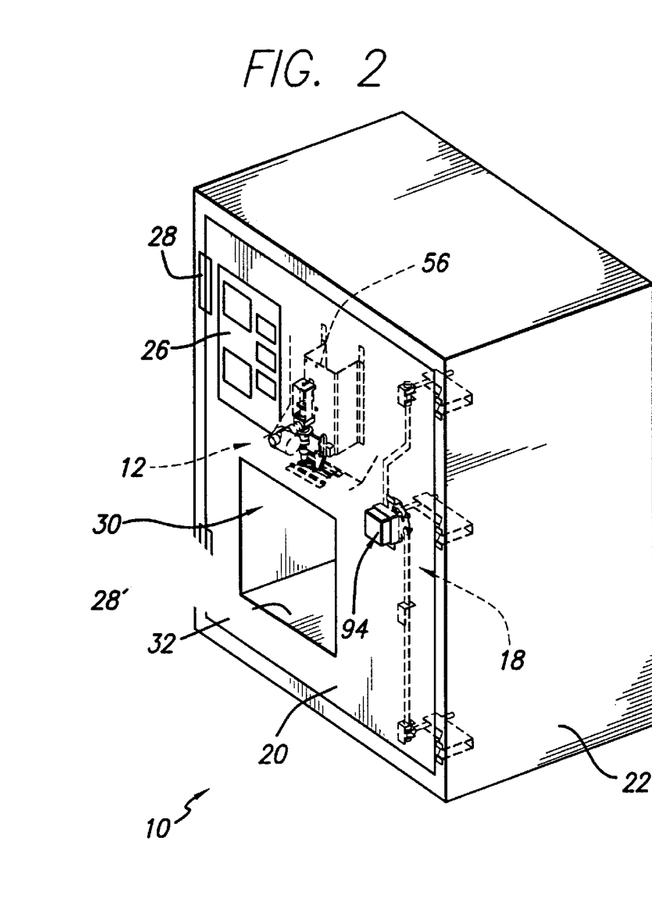
FIG. 2 is a front perspective view of the water vending machine in a normal operating configuration with a front access door closed and locked.
Figure 3:
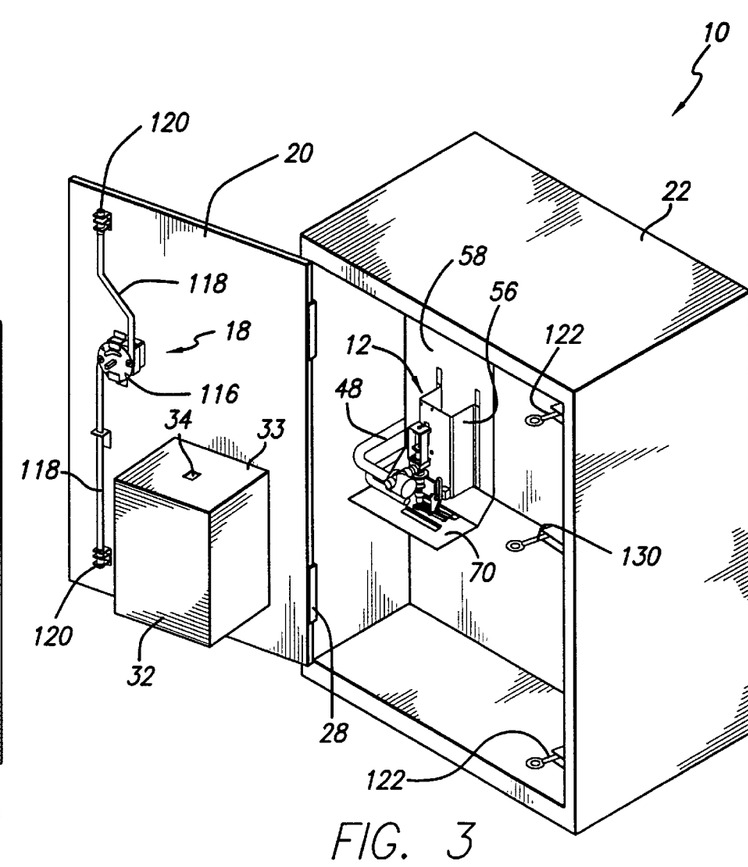
FIG. 3 is a front perspective view similar to FIG. 2, but showing the front access door unlocked and opened to permit access to interior components of the vending machine.
Figure 4:
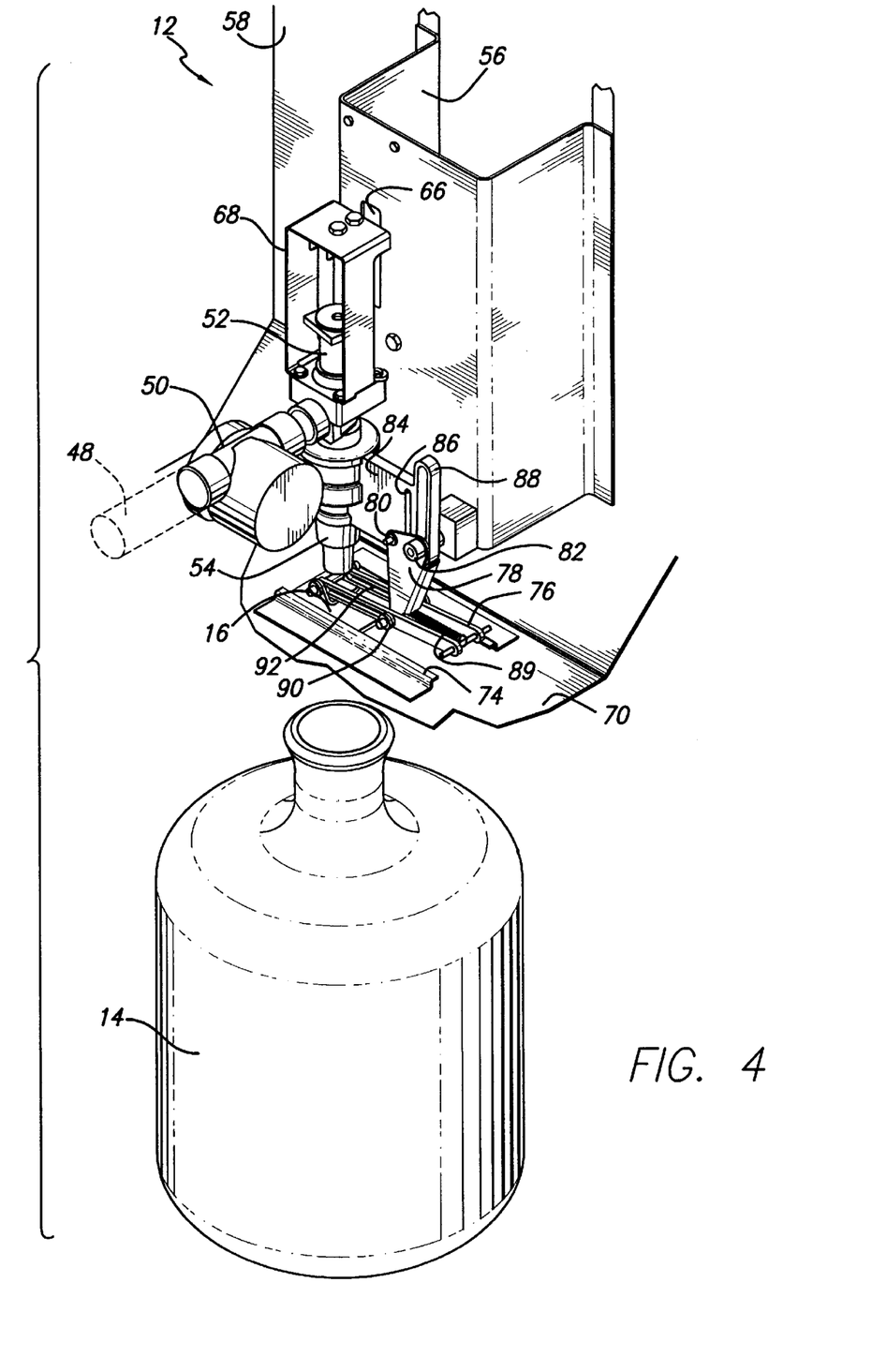
FIG. 4 is an enlarged and fragmented perspective view depicting a dispense nozzle unit with a water bottle positioned thereunder for receiving water dispensed by the vending machine.
Figure 5:
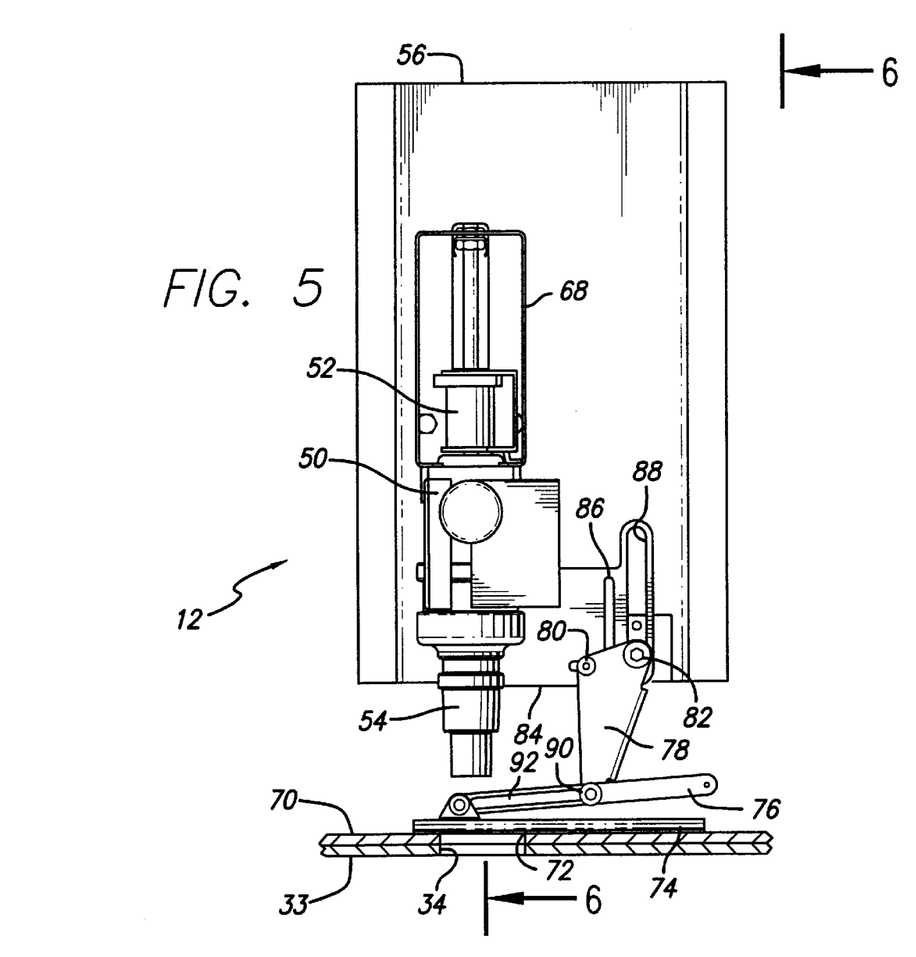
FIG. 5 is a front elevation view of the dispense nozzle unit depicted in an elevated inoperative position.
Figure 6:
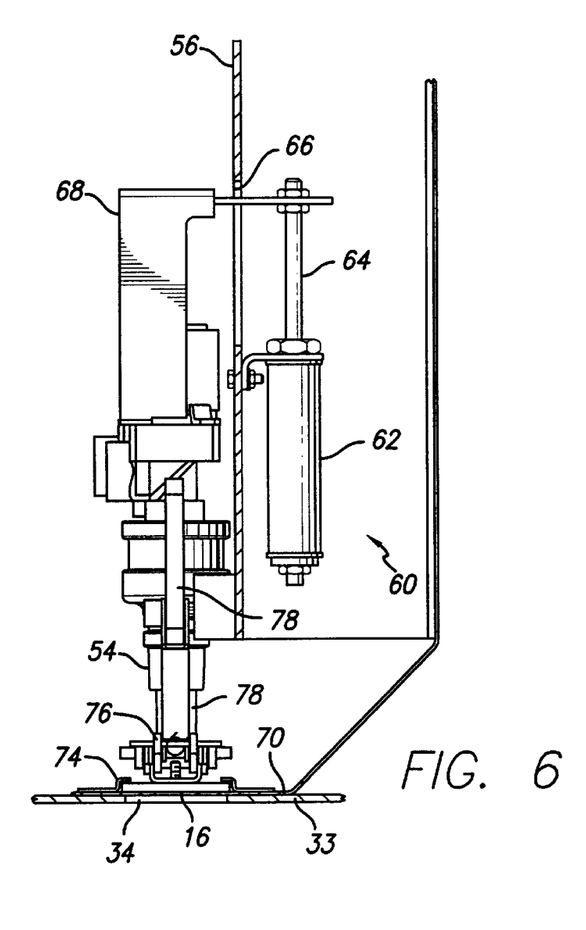
FIG. 6 is a right side elevation view of the dispense nozzle unit, taken generally on the line 6—6 of FIG. 5.

As shown in the exemplary drawings, an improved water vending machine referred to generally in FIGS. 1–3 by the reference numeral 10 is provided for dispensing a selected volume of relatively purified water from a dispense nozzle unit 12 into an underlying water container such as a traditional three or five gallon water bottle 14 or the like. The dispense nozzle unit 12 is normally concealed and protected against unauthorized access from the exterior of the vending machine 10 by means of a trap door (FIG. 1) which opens to permit water dispensing, and then re-closes. In addition, the vending machine 10 includes an improved lock assembly 18 (FIGS. 2 and 3) for securely locking a front access door 20.

The vending machine 10 generally comprises a machine housing or cabinet 22 (FIGS. 2 and 3) encasing a water purification system 24 (FIG. 1) for producing and storing a supply of relatively purified water for dispensing upon appropriate manipulation of a control panel 26 (FIG. 2) mounted typically on the front access door 20. In this regard, the access door 20 is typically mounted onto the cabinet 22 by hinges 28 to enable the door to be opened for access to components of the purification system 24, and to periodically collect money deposited into the machine by customers to purchase dispensed water. FIGS. 2 and 3 show the access door 20 to include a relatively large opening to expose a forwardly open dispense chamber 30 defined by a hollow chamber housing 32 mounted on an inboard face of the door 20. This chamber housing 32 has a size and shape for receiving and supporting the water bottle 14, normally supplied by the customer. Importantly, the chamber housing 32 includes an upper wall 33 (FIG. 3) having a dispense port 34 formed therein through which the dispense nozzle unit 12 can deliver a selected volume of purified water to the underlying water bottle 14, as will be described herein in more detail.

The purification system 24 is shown schematically in FIG. 1 to include a purification unit 36 such as a reverse osmosis unit for suitable plumbing connection to a tap water source by means of a water supply line 38. The purification unit 36 processes the tap water inflow to produce a relatively purified water supply coupled through a pure water conduit 40 to a storage reservoir 42, and to produce a reject or brine water supply with contaminants concentrated therein coupled through a waste water conduit 44 to a suitable drain site. Reverse osmosis purification units of this general type are shown and described in more detail in U.S. Pat. No. 5,045,197, which is incorporated by reference herein. In addition, as shown in FIG. 1, the purification unit 36 desirably further includes a radiation sanitization module 46 particularly such as an ultraviolet (U.V.) lamp for sterilizing the produced pure water supply.

The pure water storage reservoir 42 is coupled by a dispense conduit 48 to the dispense nozzle unit 12 (FIGS. 1–8). In general, the dispense nozzle unit 12 is programmed for operation in response to customer manipulation of the control panel 26, including the appropriate deposit of money, for dispensing a selected volume of the produced purified water from the storage reservoir 42 into the customer-supplied bottle 14. In this regard, the dispense nozzle unit 12 comprises a dispense valve 50 (FIG. 4) operated by a solenoid 52 or the like to open for a predetermined time interval to allow the selected volume of water to flow to and through a downwardly open dispense nozzle 54. This dispense nozzle 54 is vertically aligned with the dispense port 34 in the dispense chamber housing 32, for flow of the dispensed water into the underlying bottle 14. The dispense nozzle 54 can be maintained in a substantially sanitary state by means of ozone gas generated by the radiation module 46 and directed on an intermittent or continuous basis against the dispense nozzle 54 by a jet 55 (FIG. 1).

Figure 7:
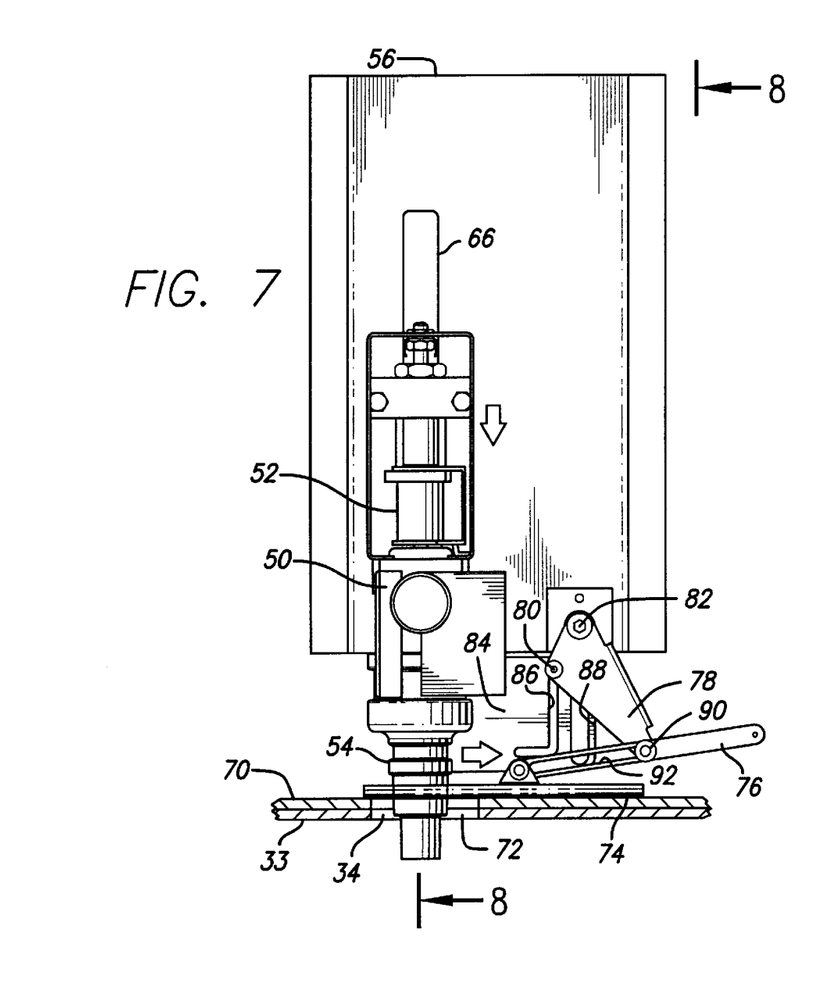
FIG. 7 is a front elevation view of the dispense nozzle unit depicted in an lowered or operative position for dispensing water.
Figure 8:
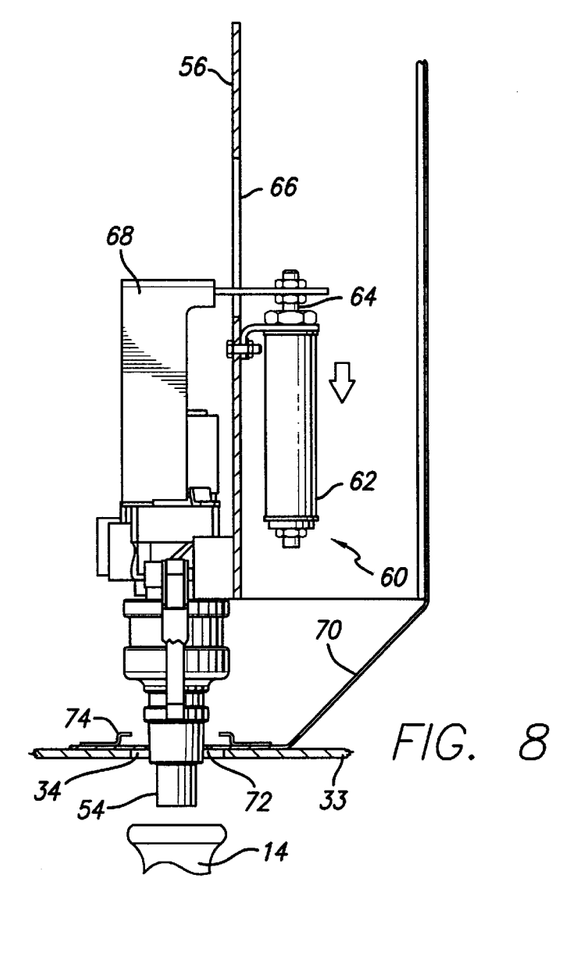
FIG. 8 is a right side elevation view of the dispense nozzle unit, taken generally on the line 8—8 of FIG. 7.

The dispense nozzle unit 12 is carried within the machine cabinet 22 on a frame bracket 56 for vertical displacement between a raised inoperative position (FIGS. 2–6) and a lowered operative position (FIGS. 7–8). More particularly, the frame bracket 56 is shown mounted onto a vertical interior cabinet wall 58. An actuator 60 such as a pneumatic actuator comprises a cylinder 62 mounted onto a rear face of the bracket 56 (FIGS. 6 and 8), and an extensible ram 64 having a free end coupled through a vertically extending cam slot 66 in the bracket 56 to the upper end of a slide carriage 68 having the dispense valve 50 and the related dispense nozzle 54 mounted thereon. The actuator 60 normally extends the ram 64 to raise or elevate the slide carriage 68 so that the dispense valve 50 and nozzle 54 are normally elevated to the inoperative position spaced above the underlying upper wall 33 of the dispense chamber housing 32. However, when the vending machine is operated to dispense water, the actuator 60 retracts the ram 64 to lower or advance the slide carriage 68, resulting in movement of the dispense valve 50 and nozzle 54 to the lowered operative position. In this operative position, as viewed in FIGS. 7–8, the dispense nozzle 54 protrudes downwardly through the dispense port 34 in the dispense chamber housing 32 into close proximity with the mouth of the underlying water bottle 14.

In accordance with one primary aspect of the invention, the trap door 16 is linked to the dispense nozzle unit 12 and is operated by the actuator 60 to open and close the dispense port 34 in the dispense chamber housing 32. The trap door 16 comprises a slide plate mounted on the upper face of a base plate 70 which has a hatch opening 72 formed therein and positioned in vertical alignment with the dispense port 34 when the access door 20 of the vending machine is closed. The trap door slide plate 16 is captured within a channeled slide track 74 for reciprocal movement between a normal position overlying and closing the hatch opening 72, and a retracted position withdrawn from and thus exposing the hatch opening 72.

To achieve this motion, the slide plate 16 is coupled by an elongated slotted link 76 to a generally triangular-shaped cam plate 78 which is in turn coupled at its upper end by a pair of cam pins 80 and 82 to a guide plate 84 mounted on and carried by the slide carriage 68. Specifically, the two cam pins 80, 82 are captured for sliding movement within a corresponding pair of generally vertically oriented cam slots 86 and 88 formed in the guide plate 84. The horizontal spacing between these two cam slots 86, 88, and their vertical lengths relative to each other are designed to regulate movement of the trap door 16 as the dispense nozzle unit 12 is raised and lowered.

More particularly, when the slide carriage 68 is in the normal elevated inoperative position (FIGS. 5–6), the cam pin 80 on the guide plate 84 is allowed to displace laterally toward the dispense nozzle 54 within a horizontal cam slot segment at the lower end of the cam slot 86, to displace the trap door 16 to a normal position closing the hatch opening 72 and the underlying dispense port 34. However, as the slide carriage 68 descends to the lower operative position, the cam pins 80, 82 move upwardly along cam slots 86, 88 in the guide plate 84, with the horizontal spacing between the slots 86, 88 causing the cam plate 78 to kick or pivot away from the dispense nozzle 54. This motion slides the trap door 16 laterally away from the underlying hatch opening 72 to open the hatch opening and the aligned dispense port 34. A compression spring 89 reacts between the link 76 and a cam pin 90 at a lower end of the cam plate 78 to urge the cam pin 90 along a link slot 92 extending in a direction laterally toward the dispense nozzle 54. This provides a degree of lost motion to facilitate the desired trap door movement, and further assists in subsequent return motion of the trap door 16 to the closed position upon return movement of the dispense nozzle unit 12 to the elevated inoperative position.

Accordingly, the dispense nozzle 54 is normally retracted to the elevated inoperative position and the trap door 16 is normally advanced to overlie and close the hatch opening 72 and the underlying dispense port 34. In this configuration, the dispense nozzle 54 is concealed and protected against exposure to the exterior of the vending machine 10, to guard against inadvertent contact with human hands and/or attempts to vandalize the nozzle. The dispense nozzle 54 is exposed by the trap door 16 only upon customer operation of the control panel 26 to dispense water.

The improved door lock assembly 18 is shown in detail in FIGS. 2, 3 and 9–17. The door lock assembly 18 generally comprises a main lock cartridge 94 having a noncircular and preferably square shape for normal seated reception into a matingly shaped lock case 96 which is securely fastened as by welding or the like onto a front face of the access door 20. To unlock and open the access door 20, for purposes of servicing internal components and/or collecting money deposited into the machine, a two step unlocking procedure is required. Specifically, the main lock cartridge 94 must first be unlocked and retracted from the lock case 96, and then rotated relative to the lock case 96 before the door can be opened. With this arrangement, the main lock cartridge 94 is normally and securely retained against rotation within the lock case 96, wherein this geometry is highly resistant to tampering and vandalism associated with unauthorized efforts to open the access door 20.

The main lock cartridge 94 comprises, in the preferred form as shown in the illustrative drawings, a square-shaped cartridge housing 98 having a generally cylindrical core 100 rotatably received therein (FIGS. 11–17). The core 100 defines a rear face 102 to include a stepped shoulder 104 forming a generally diametric land for engaging a cross bar 106 on the forward face 108 of a driven actuator plate 110. This actuator plate 110 has a generally square shape for mating fit into the cartridge housing 98, and for secure attachment thereto by means of screws 111 (FIG. 11) of the like. A drive shaft 112 shown to have a noncircular and preferably square cross section extends from the cartridge housing 98 rearwardly through an enlarged opening 114 (FIGS. 12 and 14) in the lock case 96, for rotary drive connection to a drive disk 116 which is rotatably supported against an inboard face of the access door 20 by brackets 117 or the like. As shown best in FIGS. 3 and 9–11, the drive disk 116 is pivotally coupled in turn to a pair of drive bars 118 projecting therefrom in opposite vertical directions and terminating in a pair of vertically oriented secondary latch bolts 120. These latch bolts 120 are normally received through ring-shaped keepers 122 mounted on the cabinet 22 by suitable mounting brackets 124 or the like, for normally retaining the door 20 in a closed and locked condition. Rotation of the main lock cartridge 94 transmitted via the drive shaft 112 to the drive disk 116 is effective to retract the drive bars 118 for purposes of vertically retracting the secondary latch bolts 120 from their respective keepers 122 to permit the door to be opened.

Figure 9:
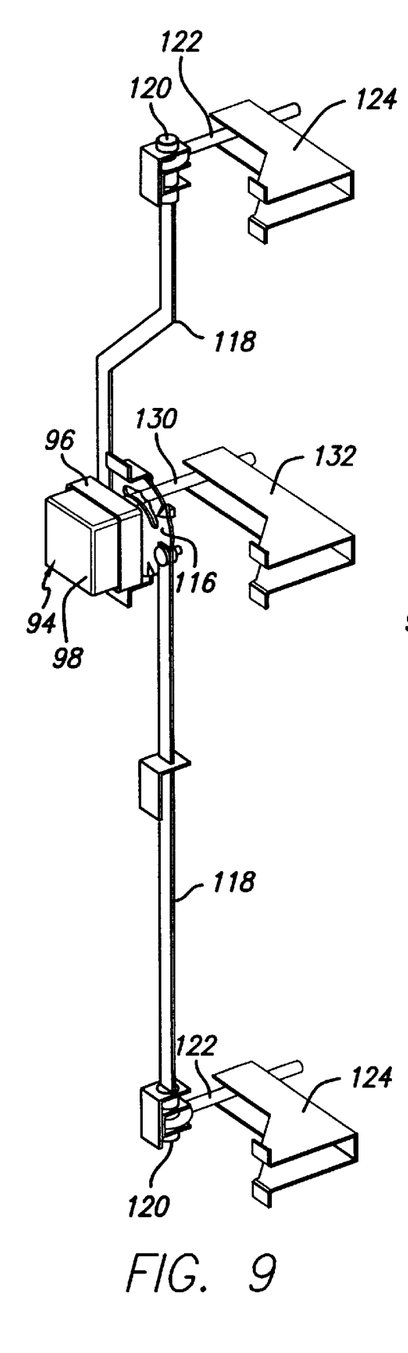
FIG. 9 is a perspective view illustrating components of a door lock assembly in a locked condition.
Figure 10:
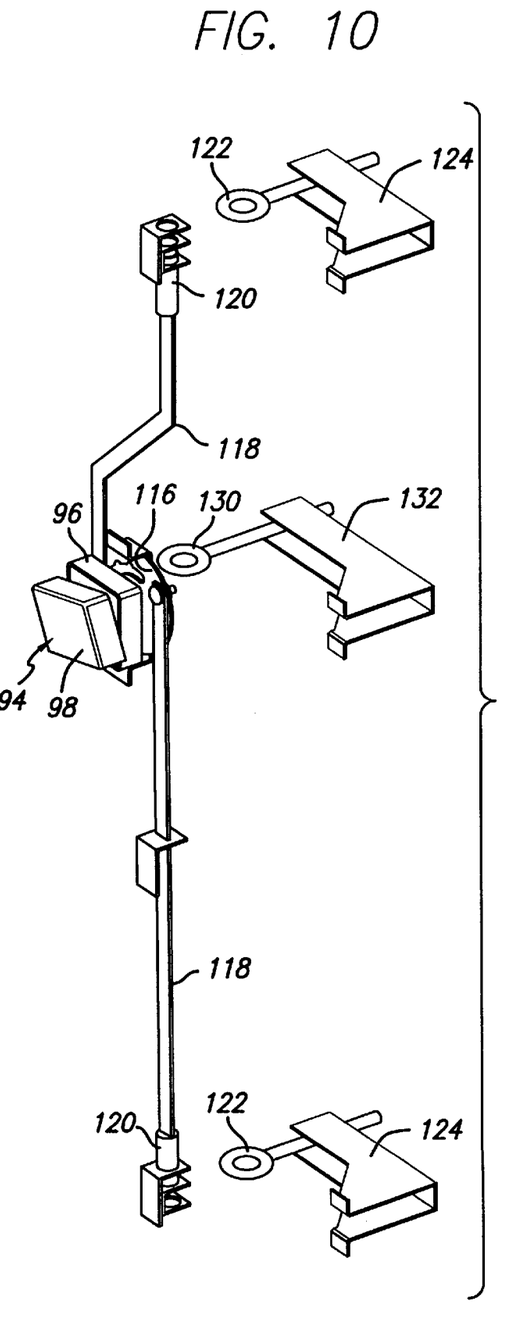
FIG. 10 is a perspective view of the door lock assembly, and depicting the components thereof in an unlocked condition.
Figure 11:
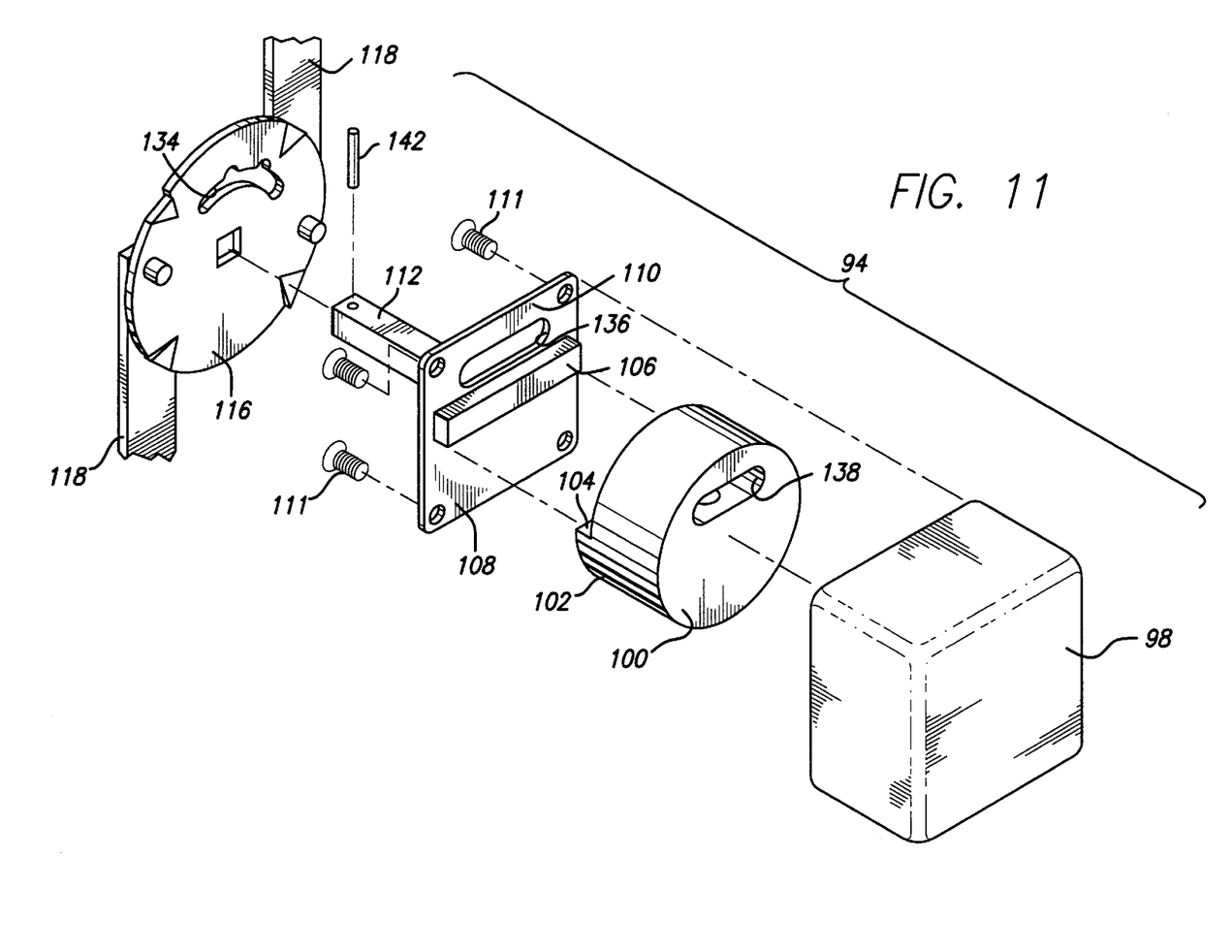
FIG. 11 is an enlarged and exploded perspective view of a main lock cartridge forming a portion of the door lock assembly.
Figure 12:
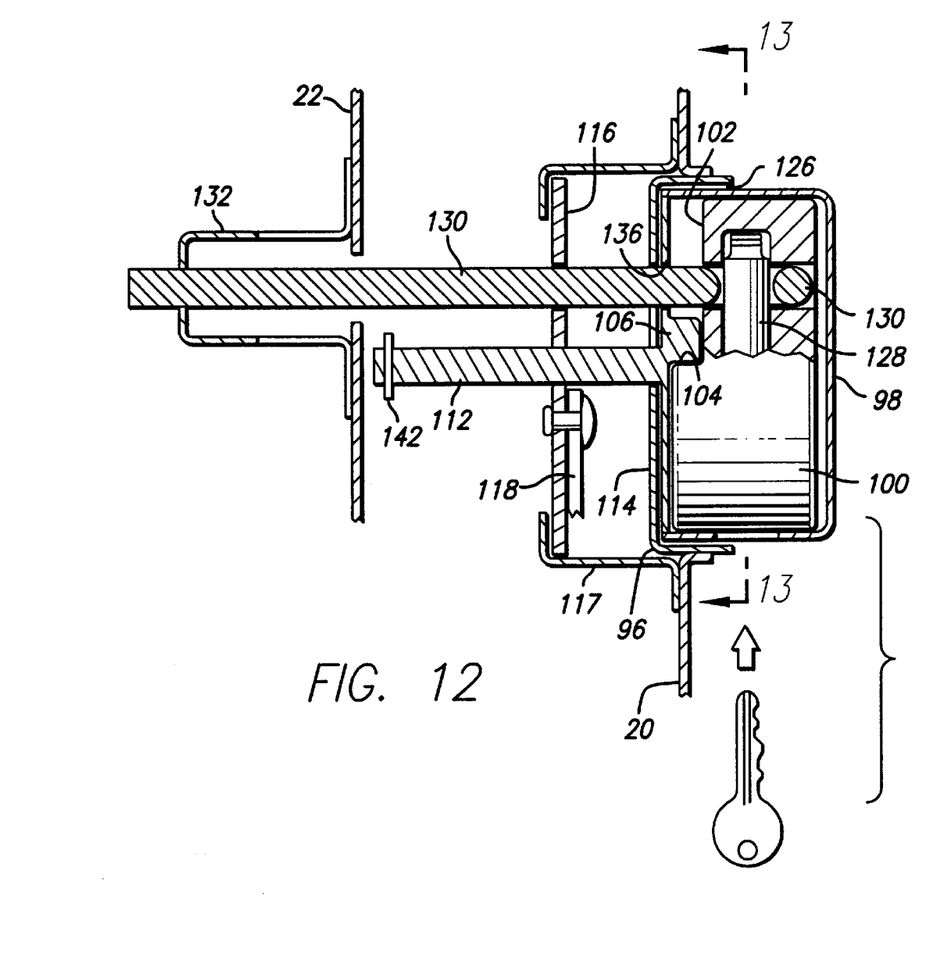
FIG. 12 is a fragmented vertical sectional view of the main lock cartridge of FIG. 11, and showing the lock cartridge in a locked condition seated within a matingly shaped lock case.
Figure 13:
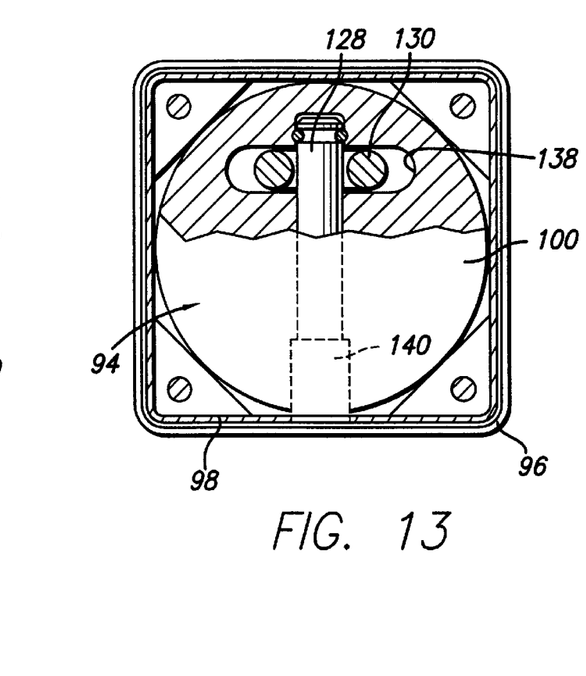
FIG. 13 is a transverse vertical sectional view taken generally on the line 13—13 of FIG. 12.
Figure 14:
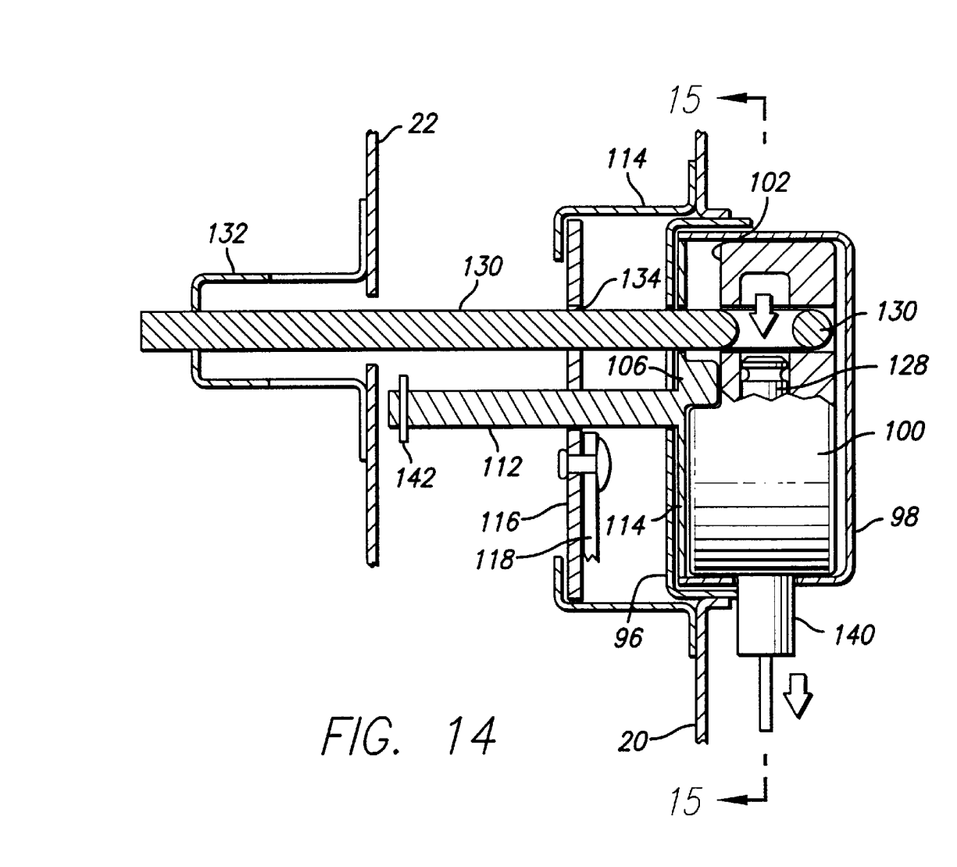
FIG. 14 is a fragmented vertical sectional view of the main lock cartridge similar to FIG. 12, but illustrating a lock cylinder thereof in an unlocked condition for retraction of a primary latch bolt.
Figure 15:
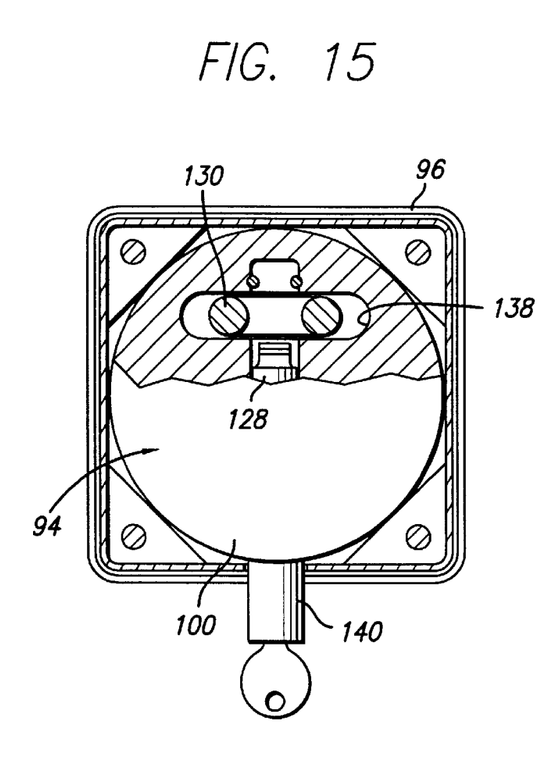
FIG. 15 is a transverse vertical sectional view taken generally on the line 15—15 of FIG. 14.
Figures 16, 17:
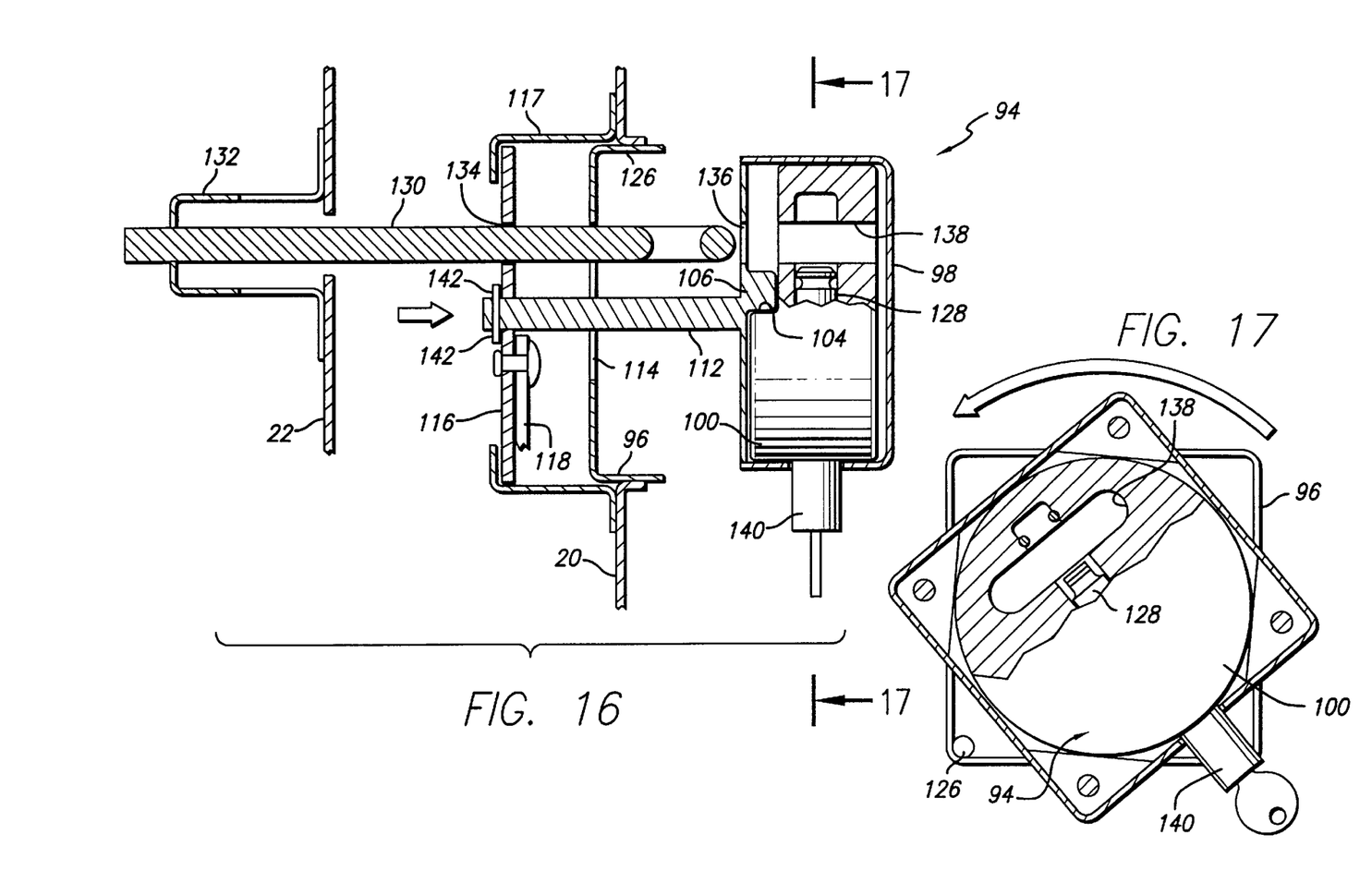
FIG. 16 is another fragmented vertical sectional view of the main lock cartridge similar to FIG. 14, but showing horizontal retraction of the main lock cartridge from the lock case to permit rotation thereof for opening the door.
FIG. 17 is a transverse vertical sectional view taken generally on the line 17—17 of FIG. 16, and illustrating lock cartridge rotation for opening the door.

However, the main lock cartridge 94 is normally seated within the matingly shaped lock case 96, so that such rotation for unlocking and opening the door is prevented. More specifically, as shown in FIGS. 12 and 14, a significant rearward portion of the main lock cartridge 94 is normally nested within the forwardly open cavity 126 of the lock case 96. In this position, a primary latch bolt 128 slidably mounted within the core 100 can be advanced into locking engagement with a ring-shaped keeper 130, also mounted on the machine cabinet 22 by a suitable bracket 132 (FIGS. 9 and 10). This keeper 130 is positioned on the cabinet 22 to extend forwardly through an arcuate slot 134 (FIGS. 11,12 and 14) formed in the drive disk 116, and further through the opening 114 in the lock case 96 and an aligned slot 136 in the actuator plate 110 for reception into a recess 138 formed in the core 100.

The core latch bolt 128, representing a primary latch bolt in the lock assembly 18, can be retracted from the associated keeper 130 upon key-actuated operation of a lock cylinder 140 exposed at the underside of the main lock cartridge 94. When the lock cylinder 140 is retracted to retract the primary latch bolt 128 from the keeper 130, as viewed in FIG. 14, the main lock cartridge 94 can be grasped and retracted from the lock case 96 (FIG. 16), with a retention pin 142 on the inboard end of the drive shaft 112 engaging the drive disk 116 to provide a limit stop to such retraction of the cartridge 94. When the lock cartridge 94 is retracted from its nested relation with the lock case, the entire cartridge 94 can be rotated to rotate the drive disk 116 and unlock the secondary latch bolts 120, as previously described, to complete the door unlocking procedure. Re-locking of the door is accomplished quickly and easily by door closure followed by reverse rotation of the main lock cartridge 94 to relock the secondary latch bolts 120, and then by advancing the main lock cartridge back into nested relation with the lock case 96. In this re-nested position, the lock cylinder 140 is reset for reengagement of the primary latch bolt 128 with the keeper 130.

The lock assembly 18 thus provides an arrangement for high security locking of the door 20, in a manner which is resistant to tampering and other efforts to achieve unauthorized door opening. The main lock cartridge 94 is securely retained within the lock case 96 against rotation for unlocking the secondary latch bolts 120, wherein it is not readily apparent to prospective vandals that the primary latch bolt 128 of the main lock cartridge 94 must first be unlocked to permit the cartridge to be retracted before any effort to open the door can succeed.

A variety of further modifications and improvements in and to the water vending machine of the present invention will be apparent to those persons skilled in the art. Accordingly, no limitation on the invention is intended by way of the foregoing description and accompanying drawings, except as set forth in the appended claims.

What is claimed is:

1. A water vending machine, comprising:
   a cabinet defining a dispense chamber exposed to the exterior of said cabinet for receiving and supporting a container adapted to receive a quantity of water to be dispensed;
   a dispense nozzle unit within said cabinet, said dispense nozzle unit including a dispense nozzle for dispensing water through a dispense port formed by said cabinet into a container positioned within said dispense chamber;
   control panel means exposed to the exterior of said cabinet for actuating said dispense nozzle unit to dispense water; and
   a trap door movable between a normal closed position closing said dispense port to conceal and protect said dispense nozzle unit against access from the exterior of said cabinet, and an open position opening said dispense port to expose said dispense nozzle and permit dispensing of water through said dispense port into the container, said trap door being movable between said closed and open positions in response to operation of said control panel;
   said dispense nozzle unit being mounted on a slide carriage for vertical reciprocation between an elevated inoperative position and a lowered operative position, and further including cam linkage means coupled between said slide carriage and said trap door for moving said trap door to said closed position when said slide carriage is in the elevated inoperative position, and for moving said trap door to said open position upon downward displacement of said slide carriage from said elevated inoperative position toward said lowered operative position, and actuator means operated by said control means for displacing said slide carriage between said inoperative and operative positions.

2. The water vending machine of claim 1 further including a storage reservoir within said cabinet for receiving and storing a supply of water to be dispensed.

3. The water vending machine of claim 1 further including a water purification unit mounted within said cabinet for producing a supply of relatively purified water to be dispensed.

4. The water vending machine of claim 3 wherein said purification unit comprises a reverse osmosis purification unit.

5. The water vending machine of claim 3 wherein said purification unit further includes a radiation sanitation module.

6. The water vending machine of claim 5 wherein said radiation sanitation module comprises an ultraviolet radiation unit, and further including means for directing ozone gas generated by said ultraviolet radiation unit against said dispense nozzle.

7. The water vending machine of claim 1 wherein said cabinet has a hinged front door mounted thereon, and further including a lock assembly for releasibly locking said front door in a normal closed position.

8. The water vending machine of claim 1 wherein said dispense nozzle unit further includes valve means operated by said control panel for dispensing a predetermined quantity of water through said dispense nozzle.

9. The water vending machine of claim 1 wherein said dispense nozzle is disposed above said dispense port when said slide carriage is in said elevated inoperative position, and wherein said dispense nozzle protrudes downwardly through said dispense port when said slide carriage is in said lowered operative position.

10. The water vending machine of claim 1 wherein said control panel is mounted on a front side of said cabinet.

11. The water vending machine of claim 1 wherein said dispense chamber is formed by a forwardly open dispense chamber housing mounted on said front door.

12. The water vending machine of claim 1 wherein said actuator means comprises a pneumatic actuator.

13. The water vending machine of claim 1 wherein said lock assembly comprises:
   a main lock cartridge having a noncircular shape;
   a lock case mounted on said door and defining a noncircular cavity for substantially mated and nested reception of said main lock cartridge to prevent rotation of said main lock cartridge relative to said lock case;
   said main lock cartridge including a primary latch bolt movable between an advanced position retaining said main lock cartridge nested within said lock case and a retracted position permitting manual retraction of said main lock cartridge from said lock case to permit rotation of said main lock cartridge relative to said lock case, said main lock cartridge further including lock means for releasibly advancing and retracting said primary latch bolt;

at least one secondary latch bolt mounted on said door for movement between an advanced position engaging a keeper mounted on said cabinet when said door is in the closed position; and drive means coupled between said main lock cartridge and said at least one secondary latch bolt for displacing said secondary latch bolt between said advanced and retracted positions in response to rotation of said main lock cartridge relative to said lock case.

14. The water vending machine of claim 13 wherein said main lock cartridge and said lock case have substantially square shapes.

15. The water vending machine of claim 13 wherein said primary latch bolt in said advanced position engages a keeper mounted on said cabinet when said door is in the closed position.

16. The water vending machine of claim 13 wherein said at least one secondary latch bolt comprises a pair of secondary latch bolts movable between said advanced and retracted positions relative to an associated pair of keepers mounted on said cabinet.

17. A look assembly for a vending machine having a cabinet and a door mounted thereon for movement between a closed position and an open position, said lock assembly comprising:

a main lock cartridge having a noncircular shape;

a lock case mounted on said door and defining a noncircular cavity for substantially mated and nested reception of said main lock cartridge to prevent rotation of said main lock cartridge relative to said lock case;

said main lock cartridge including a primary latch bolt movable between an advanced position retaining said main lock cartridge nested within said lock case and a retracted position permitting retraction of said main lock cartridge from said lock case to permit rotation of said main lock cartridge relative to said lock case, said main lock cartridge further including lock means for releasibly advancing and retracting said primary latch bolt, said main lock cartridge engaging a keeper on said cabinet when said door is in the closed position;

at least one secondary latch bolt mounted on said door for movement between an advanced position engaging a keeper mounted on said cabinet when said door is in the closed position; and drive means coupled between said main lock cartridge and said at least one secondary latch bolt for displacing said secondary latch bolt between said advanced and retracted positions in response to rotation of said main lock cartridge relative to said lock case.

18. The water vending machine of claim 17 wherein said main lock cartridge and said lock case have substantially square shapes.

19. The water vending machine of claim 17 wherein said at least one secondary latch bolt comprises a pair of secondary latch bolts movable between said advanced and retracted positions relative to an associated pair of keepers mounted on said cabinet.

* * * * *